United States Patent

[11] 3,601,343

| [72] | Inventor | Armen H. Sivaslian<br>Newport Beach, Calif. |
|---|---|---|
| [21] | Appl. No. | 855,500 |
| [22] | Filed | Sept. 5, 1969 |
| [45] | Patented | Aug. 24, 1971 |
| [73] | Assignee | North American Rockwell Corporation |

[54] STRAIN-FREE MOUNT
1 Claim, 3 Drawing Figs.

[52] U.S. Cl. .................................................. 248/2,
248/204, 350/252
[51] Int. Cl. .................................................. F16f 15/06,
F16m 13/00
[50] Field of Search .......................................... 248/1, 204,
27, 358; 350/252, 264

[56] References Cited
UNITED STATES PATENTS

| 2,140,442 | 12/1938 | Clark.............................. | 248/27 |
| 2,808,762 | 10/1957 | DeGrave ....................... | 350/252 |
| 3,360,849 | 1/1968 | Forman et al.................. | 350/252 UX |

FOREIGN PATENTS

| 604,133 | 6/1948 | Great Britain................. | 350/352 |

*Primary Examiner*—William H. Schultz
*Attorneys*—L. Lee Humphries, H. Fredrick Hamann and Richard J. Rengel ABSTRACT: A strain-free mount, for supporting an object, such as synchrostator or an optical element, relative to a base such as to allow only radial (volumetric) relative expansion or contraction and to prevent rotation or overall translation of the supported object relative to the base. This mount provides a circumferentially arranged set of thin, wide, beamlike support elements, fixedly attached to both the supported object and the base to accommodate differential radial expansion or contraction of the supported object by bending of the beams in their thin dimension, while rotation or overall translation of the supported object is resisted by the shear stiffness of the beams in their thick dimension. By suitably proportioning the beam dimensions the mount can be made to have negligible resistance to purely radial expansion or contraction of the supported object and very high resistance to rotation or overall translation. The invention herein described was made in the course of or under a contract or subcontract thereunder, with the Air Force.

PATENTED AUG 24 1971

3,601,343

INVENTOR.
ARMEN H. SIVASLIAN
BY
ATTORNEY 3,601,343

STRAIN-FREE MOUNT

BACKGROUND OF THE INVENTION

1. Field of the Invention

This invention relates to strain-free mounts for supporting a body relative to base in a manner permitting differential expansion of the body relative to the base while preventing other types of movement.

2. Description of the Prior Art

In many instances, a support for a discoid or annular body relative to a base is desirable in which differential thermal expansion of the supported body and base is provided while precluding overall translation or other types of relative movement. Such a situation may occur in the case of a synchro, where the stator must be supported relative to the rotor in a manner accurately preserving a concentric gap, while allowing differential thermal expansion due to the differing heat inputs to the rotor and stator, to take place. The need may also arise in optical apparatus, where the optical element proper; e.g., a lens or a mirror, has a different thermal expansion coefficient from that of the mount.

Various prior art attempts have been made to provide a flexible mount by use of spring-fingered sleeves. In a typical prior arrangement for mounting a glass lens in metal barrel, a spring-fingered collet is provided, urged axially by other springs against a beveled edge on the lens to maintain the lens positioned by frictional engagement. In such arrangement, however, relative expansion and contraction are accommodated primarily by relative movement permitted by the frictional engagement and not by flexing of the spring-fingers; the spring-fingers providing the spring bias required for holding of the lens in the sleeve. Moreover, relative rotation of the supported body and the base is not prevented by the frictional engagement. While this prior art arrangement might be tolerable for support of an axially symmetrical lens, it would not be tolerable for other arrangements; e.g., synchrostator, wherein relative rotation is undesirable. Further, it is often undesirable to transmit the necessary force required for frictional support of an object because the object is thereby distorted or made inoperative to any degree because of strain sensitivity. The present invention avoids this problem and effectively isolates the object from forces applied to the base which would cause any distortion of the object and undesirable effects thereof.

SUMMARY OF THE INVENTION

The present invention provides a strain-free mount for supporting an object relative to a base, such as to permit only relative radial expansion and to preclude rotation or overall translation of the object relative to the base. The mount comprises a circumferentially arranged set of thin, wide, beamlike elements, fixedly attached to both the supported object and the base. The mount is thereby enabled to accommodate differential radial expansion of the supported object by bending of the beams in their thin dimension, while rotation or overall translation of the supported object is resisted by the shear stiffness of the beams in their thick dimension. By suitably proportioning the beam dimensions the mount can be made to have negligible resistance to purely radial displacement of the supported object and very high resistance to rotation or overall translation of the object. Accordingly, the principal object of the present invention is to provide a mount which permits relative radial movement between a supported body and a base, while preventing all other kinds of movement.

Another object of the present invention is to provide a mount in which differential radial expansion or centration is provided without the need for engagement or using any coulomb friction.

A further object is to provide a mounting device for positive relative positioning of objects while providing isolation from stress of each object from the other.

Still another object is to provide positive maintenance of relative position of objects while providing isolation so as not to transmit stresses from one to another across interconnecting surfaces.

These and other objects and features of the invention will be apparent in conjunction with the description and drawings.

DESCRIPTION OF THE PREFERRED EMBODIMENT

Figure 1:
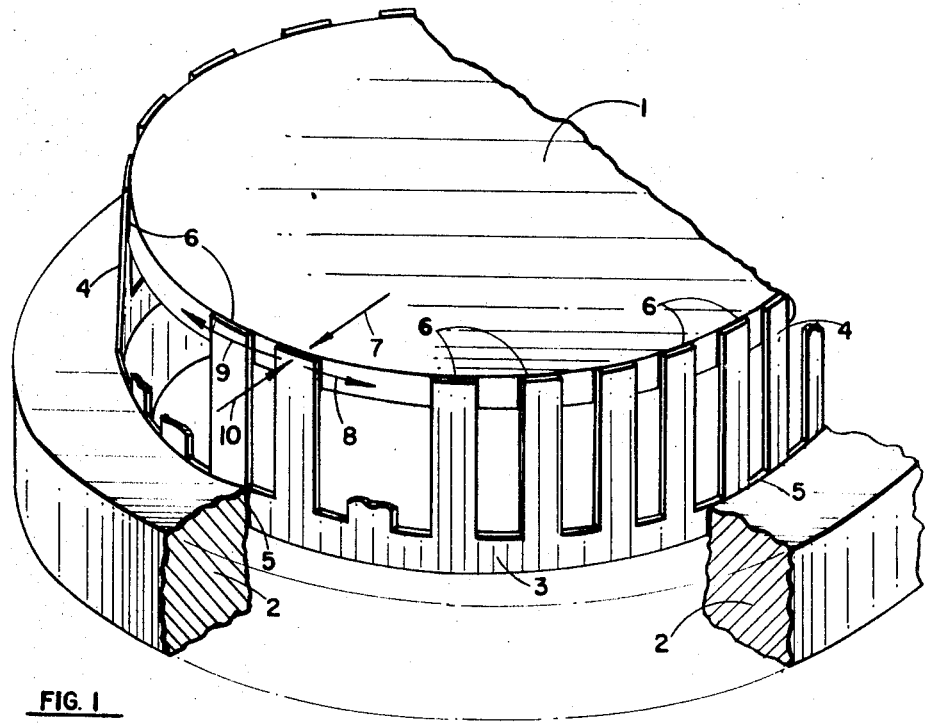
FIG. 1 is an enlarged perspective view of the preferred embodiment of the strain-free mount of the invention, partly broken away, to show certain structural details and illustrate the operation thereof.

As shown in FIG. 1, an annular member is supported relative to an annular base 2. For this purpose, the strain-free mount structure is provided comprising an annular ring portion 3 having a plurality of thin, beamlike support elements 4 projecting coaxially therefrom. The ring portion 3 is secured to the base 2 by an adhesive, solder or welding along the opposing surfaces 5 or otherwise made integral therewith. Similarly, ends of elements 4 are individually attached to the supported member 1 by adhesive, solder or by welding along opposing surfaces 6. The mount support elements 4 thus function as beams fixed at both ends. It is only by reason of securing the elements 4 at both ends, as shown and described for the various embodiments, that the mount is made capable of providing the desired function.

Figure 2:
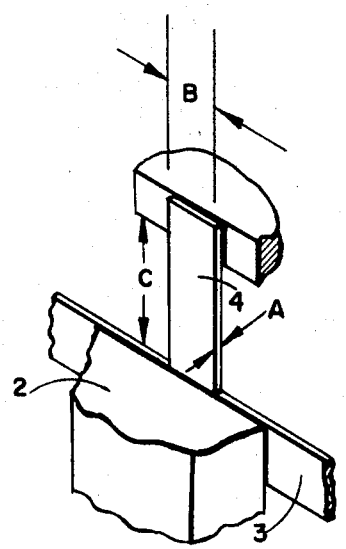
FIG. 2 is an enlarged detailed view of one of the support elements of the mount shown in FIG. 1 including portions of the base and supported member to illustrate the operation.

In operation, differential expansion of member 1 and base 2 causes a relative radial displacement force indicated by arrow 7 in FIG. 1. This results in a counter force 10 having a magnitude dependent upon the resilience of the material from which the mount is formed, the cross-sectional area of surrounding elements 4 and length C of the element (FIG. 2). As a result, the beams 4 are deflected normal to their thin dimension A (FIG. 2) in response to the radial force 7. A distinct advantage is provided by forming the mount from a continuous strip by cutting by a stamping process to provide multiple beam support elements 4 as shown in FIG. 1 in which the spacing therebetween is predetermined and fixed in the integral unit formed. This is of considerable advantage in control of parameters in any designated use, handling and particularly to facilitate assembly of structures shown in FIGS. 1 and 3. In assembly, an important feature is the arrangement of FIG. 3 in which the ring portion 3' is secured to the male member 1' which is then inserted in the surrounding base and end portions 11 of support members 4' then secured to the base 2' at opposing surfaces 6.

Rotational or shear forces represented by arrow 8 in FIG. 1 are resisted by the support elements 4 reacting in their width dimension providing a counterforce 9. More particularly, the deflection of a beam support elements 4 under a given load varies inversely with width and inversely as the cube of the thickness. Elements 4 are made very thin relative to their width. This relation is not readily depicted to scale in the drawings. As shown in FIG. 2, typical dimensions are: $C=0.25$ units, $A=0.004$ and $B=0.094$. Preferably, the ratio of $B:A$ is in the range of about 10:1 to 100:1 and according to the typical illustration, about 23.5:1. Thus, according to the illustration set forth, the stiffness of the support elements 4 to rotational or shear forces relative to the stiffness for radial forces, will be as $(23.5)^2:1$ or 550:1.

Figure 3:
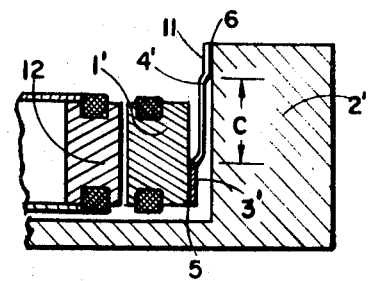
FIG. 3 is an enlarged detail view of a modified support element of the mount for illustrating an alternate preferred embodiment of the invention.

The support elements 4 are not restricted to the simple shape shown in FIGS. 1 and 2. For example, whenever a supported member 1' is to be mounted concentrically in a bored base 2', there is a distinct advantage in providing an offset construction, as shown in FIG. 3. Member 1' is shown supported within a bored base 2' by one of a set of beam support elements 4' which include steps offsetting intermediate portions from the annular ring portion 3' and end portions 11 for attachment to the supported member 1' and the base 2', respectively.

In FIG. 3, sections of a stator and rotor of a rotary electromechanical transducer; e.g., synchro, or sine wave generator are shown schematically. The support member 1' comprises the stator and rotor 12 having approximately a 3 inch diameter, for example, is supported for rotation concentrically therewith.

The spacing between base 2' and stator member 1' is very small; e.g., 0.020 inch for the exemplary 3 inch diameter stator, primarily to accommodate differential expansion thereof and isolate the stator from any strain applied to the base 2' Consequently, the increment of lateral offset between steps of the individual ones of the support elements 4' is, in this construction, very small to provide the adequate isolation for small deflections to the base 2' by strains expected to be applied in this particular transducer construction. Further, the steps offsetting the ring portion 3' and end portions 11 of beam elements 4' facilitate limiting of adhesive, solder, or welding contact to base 2' and stator 1' to the opposing surface areas of the offset portions 3' and 11. Thus, undesirable accidental adhesion of any of the support elements 4' between these portions 3' and 11 is avoided to provide complete freedom thereof to serve in bending for differential radial expansion or contraction of supported stator member 1' and base 2'.

In light of the above teachings, various modifications and variations of the present invention are contemplated and will be apparent to those skilled in the art without departing from the spirit and scope of the invention.

What I claim is:

1. A mounting device for supporting an annular member in spaced alignment with a supporting base having an annular part facing toward said member and providing for radial differential expansion or contraction of said member and base while maintaining alignment of said member and base; said mounting device comprising:

a strip of one continuous piece having a base and at least twenty elongated beam elements evenly spaced along said base, said base of said strip being bonded in a ring to said annular part of said supporting base and the end portions of said beam elements being bonded to said member with an intermediate section therebetween, said intermediate section being formed of resilient material having a width to thickness ratio between 10:1 and 100:1 to produce relatively small resistance to said differential expansion of the base and member due to thinness of said elements and relatively high resistance to overall translation of the base and supported member due to the shear stiffness provided by the width of said elements.